United States Patent
Yanik

(10) Patent No.: US 6,247,676 B1
(45) Date of Patent: Jun. 19, 2001

(54) HIGH RESOLUTION ROTARY POSITIONING APPARATUS

(76) Inventor: Gary Yanik, 8718 Man-O-War Rd., Palm Beach Gardens, FL (US) 33418

( * ) Notice: Subject to any disclaimer, the term of this patent is extended or adjusted under 35 U.S.C. 154(b) by 0 days.

(21) Appl. No.: 09/281,869

(22) Filed: Mar. 31, 1999

(51) Int. Cl.⁷ ............................... G02B 7/00; F16C 27/04
(52) U.S. Cl. ........................ 248/652; 248/664; 359/822; 384/220; 384/581
(58) Field of Search ................................ 248/637, 652, 248/664, 666; 359/819, 822, 200; 384/215, 220, 247, 581, 582

(56) References Cited

U.S. PATENT DOCUMENTS

| | | | |
|---|---|---|---|
| 1,327,026 | * | 1/1920 | Dabbs et al. .......................... 384/581 |
| 1,356,766 | * | 10/1920 | Hindle ................................. 384/581 |
| 1,652,766 | * | 12/1927 | Crouse ................................. 384/582 |
| 2,007,152 | * | 7/1935 | Allee ................................... 384/581 |
| 2,141,145 | * | 12/1938 | Wooler et al. ........................ 384/582 |
| 3,073,654 | * | 1/1963 | Richey ................................. 384/215 |
| 3,722,969 | * | 3/1973 | Eklund ................................. 308/193 |
| 3,765,071 | * | 10/1973 | Bowen ................................. 29/148.4 |
| 3,790,240 | * | 2/1974 | Pitner .................................. 384/220 |
| 3,883,194 | * | 5/1975 | Pitner .................................. 384/220 |
| 4,392,446 | * | 7/1983 | Vander Eyken et al. ......... 114/144 R |
| 4,971,458 | * | 11/1990 | Carlson ................................ 384/581 |
| 5,896,234 | * | 4/1999 | Miyamoto et al. ................. 359/819 |
| 5,946,127 | * | 8/1999 | Nagate ................................ 359/822 |
| 6,000,490 | * | 12/1999 | Easton ................................ 180/402 |

* cited by examiner

*Primary Examiner*—Ramon O. Ramirez
*Assistant Examiner*—Jon Szumny
(74) *Attorney, Agent, or Firm*—McHale & Slavin

(57) ABSTRACT

A rotary positioning device useful for positioning optical devices such as polarizing prisms, or any similar optical device through which light is transmitted and which requires precise rotation thereof. The device is particularly designed to rotate through a limited arc at an extremely fine degree of resolution. The device utilizes cylindrical bearings formed from materials having a spring constant effective to insure lateral stability without experiencing irreversible deformation. In a preferred embodiment, a Beryllium-Copper alloy is utilized for forming the cylindrical bearings.

8 Claims, 1 Drawing Sheet

HIGH RESOLUTION ROTARY POSITIONING APPARATUS

FIELD OF THE INVENTION

This invention relates to the field of rotatable positioning devices and particularly relates to devices for retaining optical components which are designed for rotation through a limited arc at an extremely fine degree of resolution, particularly those stages designed to rotate polarizing prisms, and most particularly to rotary stages which utilize cylindrical bearings formed from materials having a spring constant effective to insure lateral stability without experiencing irreversible deformation.

BACKGROUND OF THE INVENTION

Opto-mechanical devices are precision instruments useful for controlling the path along which light travels. This path is subject to six independently controlled constraints. A beam of light may travel on a particular path defined by specifying X, Y and Z coordinates. This beam of light is further defined in terms of its rotation about these same axes. This rotation about the X, Y and Z axes is referred to as roll, pitch and yaw respectively. The ability to accurately detect these parameters with a high degree of resolution is required for a variety of applications. For example, detection of a particular species of organic compound, e.g. those having dextrorotatory or levorotatory characteristics requires the ability to measure the rotation of light about an axis as it passes through a solution containing the compound being investigated. This same inventor, in U.S. Pat. No. 5,822,067, Oct. 13, 1998, the contents of which are herein incorporated by reference, describes an optical detection system for use in measuring optical activity within a sample as it flows through a detector consisting of a laser diode with a beam shaping means, a polarizing prism, a flow cell, and a means for attenuating laser fluctuation effects from the sensed signal. In order to control the rotation of the polarizing prism with a high degree of precision, it is known to utilize micro-precision rotation stages.

Micro-precision rotation stages suitable for such applications are available from a variety of manufacturers. Among these are the Melles Griot company, which markets a variety of stages having multiple drive knobs for vernier scale adjustment and operation at resolutions from 5 arc min to 18 arc sec. Another type of rotation stage is available from the Newport Corporation, which manufactures a broad variety of both manual and motorized rotary stages. The Newport devices provide rotary stages having a center aperture which permits the mounting and adjustment of rotating components in light transmissive applications. The Newport rotary stages provide preloaded bearings which are placed in precision-ground races. These stages provide resolution in the range of 4 arc sec–30 arc min.

The Aerotech Corp. manufactures a rotary stage with a clear aperture, marketed under the name ARS301, which utilizes a "sub-arc" second resolution drive mechanism, capable of achieving a 0.1 arc sec resolution. The rotating portion is supported by ball bearings and rotation is effected by manipulation of a steel spring which is placed circumferentially about the rotating portion and is extended or retracted via a finely-threaded adjustment screw.

The problem with these prior art devices is that the use of ball bearings fails to provide a system which accurately and repeatably translates the minute angular excursions of the rotary stage into true linear movement. The bearings are not perfectly round, and they are not being utilized in a manner consistent with their intended function. If a bearing and race combination is included, e.g in a wheel and axle assembly, the bearings make many complete revolutions per minute as they reduce the frictional forces which would otherwise hamper the wheel's rotation. In such an environment, minute inconsistencies in the bearings are of no real consequence. In environments such as that of the instant application, the bearings do not revolve, rather they are moved back and forth over a very small portion of their circumference, on the order of 5–10 degrees. In this type of an environment, inconsistencies in the "roundness" of the bearings result in a substantial reduction in the repeatable resolution which can be attained with such devices.

As an alternative to the use of ball bearings in limited movement applications, another type of flexural joint is available from the C-Flex Bearing Co. Both the C-Flex joint and a similar device available from the Lucas Aerospace Power Transmission Corp. are low hysteresis, frictionless joints designed to provide accurate linear movement in limited rotation environments. The design of these joints, do not, however, provide a clear central aperture, and therefore would not be useful for mounting of light transmissive devices such as polarizing prisms.

Thus, what is lacking in the art, is a rotary positioning device having a clear aperture for inclusion of light transmissive optical equipment which is capable of positioning such equipment for precise and reproducible rotation at resolutions finer than 0.1 arc seconds.

SUMMARY OF THE INVENTION

The present invention provides a rotary positioning apparatus having a clear central aperture and enhanced resolution and stability. The apparatus is especially useful for positioning optical devices, for example polarizing prisms, or any similar optical device through which light is transmitted and which requires precise rotation thereof. It is extremely important, when positioning a device such as a polarizing prism, that the plane in which the prism rotates is maintained perpendicular to the path of the light beam. Prior art rotary positioning stages allowed for rotation of such a device about an axis with up to about 0.1 arc second resolution, however the lateral stability along the axis of rotation denigrated the efficacy of these devices. The present invention provides a rotary positioning apparatus which includes a mounting device that may be affixed to a work surface, for example, a laboratory bench or the like. The mounting device is formed with a generally cylindrical aperture of a particular diameter, and is constructed so that it will accept a circular retention ring, having a smaller diameter, that is positioned within the device and in coaxial alignment therewith. In the annular space between the mounting device and retention ring, a plurality of cylindrically shaped bearing members are symmetrically positioned in corresponding machined areas and are in flexural engagement with the mounting device and retention ring. The bearing members are formed from a material having a spring constant value effective for maintaining lateral stability without experiencing irreversible deformation. In a preferred embodiment, the bearing members are formed from a beryllium-copper alloy or from an elastomeric material. This arrangement creates a rotational flexural joint having a useful range of rotation of up to about 4 degrees, subsequent to pre-loading. The apparatus further includes a rotation means in mechanical engagement with said retention ring and extending perpendicularly to the axis thereof. In a preferred embodiment, the rotation means is formed as an upstanding member attached to the outer periphery of the retention ring and fixed within a plane perpendicular to the axis of rotation. In use, the apparatus may be initially pre-loaded by applying a force to the rotation means so as to rotate the retention ring up to about 5 degrees. This pre-loading step increases the forces of flexural engagement between the parts of the device thereby enhancing the degree of axial and lateral stability which is achieved and the concomitant attainable resolution. Subsequent application of force to said rotation means results in reproducible rotation of said retention ring with a degree of resolution of at least about 0.035 arc seconds, which represents almost a three-fold improvement over prior art devices.

Accordingly, it is an objective of the instant invention to disclose a rotary positioning device displaying a repeatable resolution of at least about 0.035 arc seconds.

It is a further objective of the present invention to teach a rotary positioning device incorporating a plurality of flexurally engaged cylindrical bearing members.

It is yet an additional objective of the instant invention to teach a rotary positioning device which exhibits increased axial and lateral stability as a result of pre-loading of the cylindrical bearings.

Other objectives and advantages of this invention will become apparent from the following descriptions taken in conjunction with the accompanying drawings wherein set forth, by way of illustration and example, are certain embodiments of this invention. The drawings constitute a part of this specification and include exemplary embodiments of the present invention and illustrate various objects and features thereof.

DETAILED DESCRIPTION OF THE INVENTION

Figure 1:
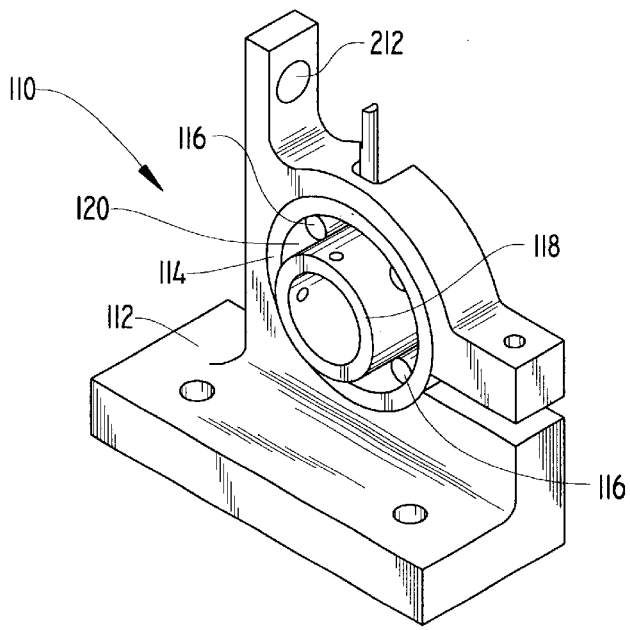
FIG. 1 is a perspective view of the rotary positioning apparatus.

It is to be understood that while we have illustrated and described certain forms of the invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

In accordance with FIG. 1, a rotary positioning apparatus 110 is shown which contains a mounting device 112 adapted to be fixedly secured to a work surface (not shown). The device has a generally circular aperture 114 therethrough, which is constructed and arranged to retain a plurality of cylindrically shaped bearing members 116 in flexural engagement with a coaxially positioned retention ring 118; the retention ring is circular in cross-section, and has an outermost circumference of lesser diameter than the diameter of the mounting device circular aperture, such that when the retention ring is positioned within the mounting device and is coaxially aligned therewith, an annular region 120 is defined for fixed positioning of the cylindrically shaped bearing members 116. The bearing members 116 are in flexural engagement with the mounting device 112 and the retention ring 118 and are fixedly positioned within the annular region. Upon rotation of the retention ring 118, the combination of the mounting device 112, bearing members 116 and retention ring 118 exert symmetrical and axially directed forces about the circumference within said annular region, thereby providing enhanced axial and lateral stability. The cooperation of elements results in a device which is able to repeatedly maintain resolution in the range of about 0.035 arc seconds.

Figure 2:
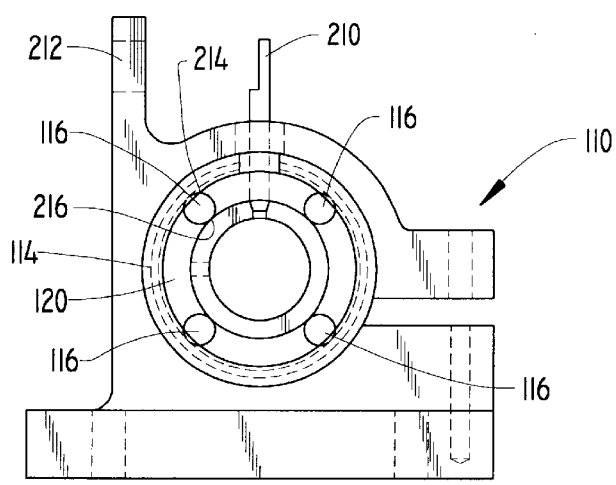
FIG. 2 is a frontal plan view of the rotary positioning apparatus.

Referring now to FIG. 2, a frontal plan view of the rotary positioning apparatus is shown. The rotary positioning apparatus 110 includes rotation means 210 in mechanical engagement with the retention ring 118 and extending perpendicularly to the axis thereof. Application of a force to the rotation means within a plane perpendicular to the axis of the apparatus, will result in rotation of the retention ring. In a preferred embodiment, the retention ring 118 is first rotated approximately 5 degrees. This step, referred to as pre-loading, places tension upon the flexural connection between the bearings 116, mounting device 112 and retention ring 118. The bearings 116 are fixedly mounted within annular space 120 and are symmetrically positioned within corresponding machined areas 214 and 216, which areas are formed within the mounting device 112 and retention ring 118 respectively. Further rotation of up to about 4 degrees produces reproducible movement of the retained optical component, for example a polarizing prism (not shown) with resolution of about 0.035 arc seconds. The rotary force may be applied to the rotation means 210 by virtue of either a mechanical or electromechanical device, which is mounted in aperture 212. In a preferred embodiment, the force is derived from any standard piezo motor or mechanical micrometer, which are not shown.

Figure 3:
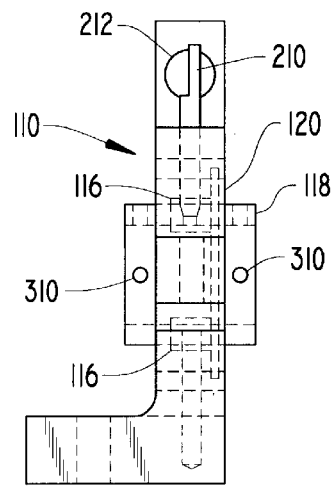
FIG. 3 is a side plan view of the rotary positioning apparatus.

With reference to FIG. 3, a side plan view of the rotary positioning apparatus 110 is shown. The flexural engagement of the bearing members 116, retention ring 118 and mounting device 112 are shown. Further, apertures 310 positioned in retention ring 118 are shown. These apertures retain suitable retention devices, for example set screws (not shown) for mounting of any desired device therein, for example a polarizing prism or the like.

Figure 4:
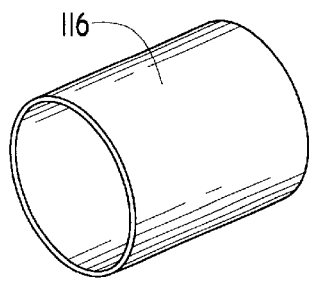
FIG. 4 is a perspective view of a cylindrical bearing embodiment.

In accordance with FIG. 4, the bearing members 116 are formed from a material having a spring constant value effective for maintaining lateral stability without experiencing irreversible deformation. In one particular embodiment, the bearing members are formed from a beryllium-copper alloy, having an outer diameter of 0.250", a wall thickness of 0.010" and a length of 0.285". Alternatively, the bearing members may be formed from any suitable elastomeric material, having an appropriate spring constant.

Although the invention has been described in specific embodiments, it will be readily apparent to those skilled in this art that various modifications, rearrangements and substitutions can be made without departing from the spirit of the invention. The scope of the invention is defined by the claims appended hereto.

What is claimed is:

1. A rotary positioning apparatus comprising:

a mounting device adapted to be fixedly secured to a work surface, said mounting device having a generally circular aperture therethrough, a plurality of cylindrically shaped hollow bearing members in flexural engagement with a coaxially positioned retention ring are retained within said aperture;

said retention ring being circular in cross-section, and having an outermost circumference of lesser diameter than the diameter of said mounting device circular aperture, such that when said retention ring is positioned within said mounting device and is coaxially aligned therewith, an annular region is defined for fixed positioning of said cylindrically shaped hollow bearing members;

said bearing members being in flexural engagement with said mounting device and said retention ring and being fixedly positioned within said annular region; and rotation means selected from the group consisting of a piezo motor and a mechanical micrometer, said rotation means being in mechanical engagement with said retention ring and extending perpendicularly to the axis thereof;

whereby application of a force to said rotation means within a plane perpendicular to the axis of said apparatus, will result in rotation of said retention ring and, upon rotation of said retention ring, the combination of said mounting device, bearing members and retention ring exert symmetrical and axially directed forces about the circumference within said annular region, thereby providing said retention ring with enhanced axial and lateral stability.

2. The rotary positioning apparatus of claim 1 wherein said bearing members are formed from a material having a spring constant value effective for maintaining lateral stability without experiencing irreversible deformation.

3. The rotary positioning apparatus of claim 2 wherein said bearing members are formed from a beryllium-copper alloy.

4. The rotary positioning apparatus of claim 2 wherein said bearing members are formed from an elastomeric material.

5. The rotary positioning apparatus of claim 1 wherein said retention ring includes a retaining means effective for securing an optical device therein.

6. The rotary positioning apparatus of claim 5 wherein said optical device is a polarizing prism.

7. The rotary positioning apparatus of claim 1 wherein said retention ring is pre-loaded by an initial rotation of up to about 5 degrees;

whereby said retention ring achieves an increased degree of axial and lateral stability.

8. The rotary positioning apparatus in accordance with claim 1, further including:

means for preventing rotation of said bearing members within said annular region.

* * * * *